United States Patent
Chien (10) Patent No.: US 10,620,466 B2
(45) Date of Patent: Apr. 14, 2020

(54) LIQUID CRYSTAL DISPLAY AND FRAME STRUCTURE

(71) Applicants: HKC Corporation Limited, Shenzhen, Guangdong (CN); Chongqing HKC Optoelectronics Technology Co., Limited, Chongqing (CN)

(72) Inventor: Chung-Kuang Chien, Chongqing (CN)

(73) Assignees: HKC Corporation Limited, Shenzhen, Guangdong (CN); Chongqing HKC Optoelectronics Technology Co., Limited, Chongqing (CN)

( * ) Notice: Subject to any disclaimer, the term of this patent is extended or adjusted under 35 U.S.C. 154(b) by 380 days.

(21) Appl. No.: 15/561,571

(22) PCT Filed: Apr. 28, 2017

(86) PCT No.: PCT/CN2017/082365
§ 371 (c)(1),
(2) Date: Sep. 26, 2017

(87) PCT Pub. No.: WO2018/176550
PCT Pub. Date: Oct. 4, 2018

(65) Prior Publication Data
US 2019/0391439 A1    Dec. 26, 2019

(30) Foreign Application Priority Data
Mar. 27, 2017    (CN) ........................ 2017 1 0186584

(51) Int. Cl.
*G02F 1/1333*    (2006.01)
*G02F 1/1339*    (2006.01)
*G02F 1/13357*    (2006.01)

(52) U.S. Cl.
CPC ...... *G02F 1/133308* (2013.01); *G02F 1/1339* (2013.01); *G02F 1/133608* (2013.01)

(58) Field of Classification Search
CPC ......... G02F 1/133308; G02F 1/133608; G02F 1/1339
See application file for complete search history.

(56) References Cited

U.S. PATENT DOCUMENTS 9,036,124 B2 * 5/2015 Jo .......................... G02F 1/1345
349/149
9,128,314 B2 * 9/2015 Yoon ................. G02F 1/133308
(Continued)

FOREIGN PATENT DOCUMENTS

CN    101308292 A    11/2008
CN    101515085 A    8/2009
(Continued)

OTHER PUBLICATIONS

International Search Report dated Dec. 29, 2017, in the corresponding PCT application PCT/CN2017/082365, 11 pages in Chinese.

*Primary Examiner* — Hoan C Nguyen
(74) *Attorney, Agent, or Firm* — Juan Carlos A. Marguez; Marquez IP Law Office, PLLC (57) ABSTRACT

A liquid crystal display includes: a back light unit, including a back light module and a backplane bearing the back light module; a liquid crystal display panel, engaged with the backplane by means of a spacer; and a frame structure, including: a spacer, having a first surface and a second surface, and formed by extending in a direction perpendicular to a periphery of the frame structure towards a position between the backplane and the liquid crystal display panel; a first glue receiving slot, disposed at a rear end of the spacer; and a second glue receiving slot, disposed at a front end of the spacer, where the first and second glue receiving slots are disposed in a staggered manner, the first glue receiving slot is located at the first surface of the spacer, and the second glue receiving slot is located at the second surface of the spacer.

16 Claims, 7 Drawing Sheets

(56) References Cited

U.S. PATENT DOCUMENTS

| 9,244,298 B2* | 1/2016 | Ishida | G02F 1/133308 |
|---|---|---|---|
| 2013/0215072 A1 | 8/2013 | Lin | |
| 2014/0176849 A1* | 6/2014 | Lee | G02F 1/133308 |
| | | | 349/58 |
| 2018/0292701 A1* | 10/2018 | Chien | G02F 1/133308 |

FOREIGN PATENT DOCUMENTS

| CN | 102332227 A | | 1/2012 |
|---|---|---|---|
| CN | 102566824 A | | 7/2012 |
| CN | 103149743 A | | 6/2013 |
| CN | 105929583 A | | 9/2016 |
| JP | 2014178552 A | * | 9/2014 |

* cited by examiner

LIQUID CRYSTAL DISPLAY AND FRAME STRUCTURE

BACKGROUND

Technical Field

This application relates to a liquid crystal display and a frame structure, and in particular, to a light-leakage-preventive and glue-overflowing-resistant liquid crystal display and frame structure.

Related Art

With the development of the flat panel display technology, the conventional canal ray tube display is gradually replaced with the liquid crystal display (LCD) because the liquid crystal display has superior features such as the light weight and thin structure, low power consumption, and zero radiation. Generally, a liquid crystal display is mainly formed by a liquid crystal display panel, a back light unit, a frame, and a front bezel. In recent years, the technique of liquid crystal display panels develops towards the trend of narrow bezel or zero bezel, and requirements on assembling of an entire machine are increasingly strict, and especially when narrow bezel or zero bezel is matched with a curved panel in designing, a phenomenon of light leakage may easily occur after the frame and the back light unit are assembled with the liquid crystal display panel.

The practice of the conventional art has the following problems: Because a part of the frame to be dispensed is plane-shaped, a problem of glue overflowing easily occurs in the gel dispensing process, and consequently, not only longer time is needed for the silica gel to be solidified, but also yield of production of the liquid crystal display is severely affected; the silica gel cannot be evenly distributed at the frame and has a phenomenon of light leakage after a high temperature test.

SUMMARY

To resolve the foregoing technical problem, an objective of this application is to provide a liquid crystal display and a frame structure, and in particular, this application relates to a light-leakage-preventive and glue-overflowing-resistant liquid crystal display and frame structure.

The objective of this application is achieved and the technical problem of this application is resolved by using the following technical solution.

This application provides a frame structure applied to a display, comprising:
  a spacer, having a first surface and a second surface, and formed by extending in a direction perpendicular to a periphery of the frame structure;
  a first glue receiving slot, disposed at a rear end of the spacer; and
  a second glue receiving slot, disposed at a front end of the spacer, where
  the first glue receiving slot and the second glue receiving slot are disposed in a staggered manner, the first glue receiving slot is located at the first, surface of the spacer, and the second glue receiving slot is located at the second surface of the spacer.

In an embodiment of this application, the first glue receiving slot comprises a plurality of glue receiving holes formed at the rear end of the spacer of the frame structure.

In an embodiment of this application, the second glue receiving slot comprises a plurality of glue receiving holes formed at the front end of the spacer of the frame structure.

In an embodiment of this application, the first glue receiving slot comprises a plurality of glue receiving troughs formed at the rear end of the spacer of the frame structure.

In an embodiment of this application, the second glue receiving slot comprises a plurality of glue receiving troughs formed at the front end of the spacer of the frame structure.

In an embodiment of this application, the glue receiving troughs are wavy glue receiving troughs.

Another objective of this application is a liquid crystal display and is achieved by using the following technical solution.

A liquid crystal display comprises:
  a back light unit, comprising a back light module and a backplane bearing the back light module;
  a liquid crystal display panel, engaged with the backplane by means of a spacer; and
  a frame structure, comprising:
  a spacer, having a first surface and a second surface, and formed by extending in a direction perpendicular to a periphery of the frame structure towards a position between the backplane and the liquid crystal display panel;
  a first glue receiving slot, disposed at a rear end of the spacer; and
  a second glue receiving slot, disposed at a front end of the spacer, where
  the first glue receiving slot and the second glue receiving slot are disposed in a staggered manner, the first glue receiving slot is located at the first surface of the spacer, and the second glue receiving slot is located at the second surface of the spacer.

In an embodiment of this application, the silica gel is embedded by using a dispenser in a gel dispensing process, so that the frame structure is respectively adhered to the backplane and the liquid crystal display panel.

In an embodiment of this application, the back light module at least comprises a diffuse sheet, a prism sheet, and a reflective brightness enhancement film that are disposed on the backplane according to a sequence.

In an embodiment of this application, the first glue receiving slot and the second glue receiving slot respectively comprise a plurality of glue receiving holes formed at the rear end and the front end of the spacer of the frame structure.

In an embodiment of this application, the first glue receiving slot and the second glue receiving slot respectively comprise a plurality of glue receiving troughs formed at the rear end and the front end of the spacer of the frame structure.

Still another objective of this application is a frame structure applied to a display, comprising: a spacer, having a first surface and a second surface, and formed by extending in a direction perpendicular to a periphery of the frame structure; a first, glue receiving slot, disposed at an rear end of the spacer, where the first glue receiving slot is located at the first surface of the spacer; and a second glue receiving slot, disposed in a staggered manner with the first glue receiving slot, and disposed at a front end of the spacer, where the second glue receiving slot is located at the second surface of the spacer, where the first glue receiving slot and the second glue receiving slot comprise a plurality of glue receiving holes or a plurality of glue receiving troughs.

In an embodiment, the glue receiving holes are a trough-shaped glue receiving hole or a plurality of glue receiving holes that are arranged at intervals.

In an embodiment, the glue receiving troughs are wavy glue receiving troughs.

This application in which exemplary adhered conductive adhesive and foam are replaced with black silica gel, and spacers of a frame structure of a liquid crystal display are designed in a shape that can accommodate overflowed glue has several advantages as below: the strength of solidified black silica gel may reach 2 MPa or more in a reliability analysis (RA) test, so that only 8 to 12 screws need to be used for locking a frame and a backplane, effectively resolving the problem that large manpower is needed for assembling in the conventional art; because the black silica gel has adhesion and ductibility, the problem of pollution caused by falling of gel scrap after a conductive adhesive and a foam are adhered in the conventional art, a complicated step of adhering the conductive adhesive and the foam is omitted, and production efficiency of the liquid crystal display is improved; the black silica gel is black gel and can narrow a gap between the frame and the backplane and effectively prevent the problem of light leakage at the side of the liquid crystal display; and the structural design of the frame improves the problem of glue overflowing in a gel dispensing process.

DETAILED DESCRIPTION

The following embodiments are described with reference to the accompanying drawings, which are used to exemplify specific embodiments for implementation of this application Terms about directions mentioned in this application, such as "on", "below", "front", "back", "left", "right", "in", "out", and "side surface" merely refer to directions of the accompanying drawings. Therefore, the used terms about directions are used to describe and understand this application, and are not intended to limit this application.

The accompanying drawings and the description are considered to be essentially exemplary, rather than limitative. In figures, units with similar structures are represented by using the same reference number. In addition, for understanding and ease of description, the size and the thickness of each component shown in the accompanying drawings are arbitrarily shown, but this application is not limited thereto.

In the accompanying drawings, for clarity, thicknesses of a layer, a film, a panel, an area, and the like are enlarged. In the accompanying drawings, for understanding and ease of description, thicknesses of some layers and areas are enlarged. It should be understood that when a component such as a layer, a film, an area, or a substrate is described to be "on" "another component", the component may be directly on the another component, or there may be an intermediate component.

In addition, in this specification, unless otherwise explicitly described to have an opposite meaning, the word "include" is understood as including the component, but not excluding any other component. In addition, in this specification, "on" means that a component is located on or below a target component, but does not mean that the component needs to be located on top of a gravity direction.

To further describe the technical means adopted in this application to achieve the preset application objective thereof, specific implementations, structures, features, and effects of a liquid crystal display and a frame structure provided according to this application are described in detail below with reference to the drawings and preferred embodiments.

Figure 1:
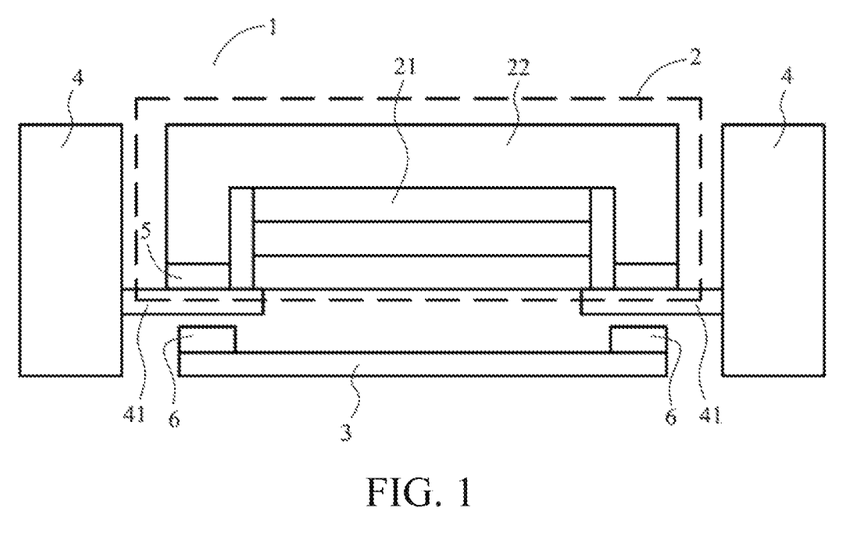
FIG. 1 is a partially structural schematic diagram of an exemplary liquid crystal display.

Referring to FIG. 1, FIG. 1 is a partially structural schematic diagram of an exemplary liquid crystal display 1. As shown in FIG. 1, the liquid crystal display 1 includes a back light unit 2, a liquid crystal display panel 3, and a frame 4. The back light unit 2 may be formed by a back light module 21 and a backplane 22. The back light module 21 includes a diffuse sheet, a prism sheet, and a reflective brightness enhancement film. A spacer 41 is integrally shaped with the frame 4 and is formed by extending from the frame 4 in the direction towards a position between the backplane 22 and the liquid crystal display panel 3.

A method for assembling the liquid crystal display 1 in FIG. 1 includes: engaging the backplane 22 of the back light unit 2 with the spacer 41 by means of an adhesive 5, and engaging the spacer 41 with the liquid crystal display panel 3 by means of an adhesive 6. The adhesives 5 and 6 may be adhesives such as double faced adhesive tapes, foam tapes, or lightproof adhesive tapes. When the liquid crystal display 1 is at a high temperature, the adhesive 5 between the backplane 22 and the spacer 41 of the frame 4 easily loses an adhesive force, and therefore, a gel dispensing process of silica gel develops.

Figure 2:
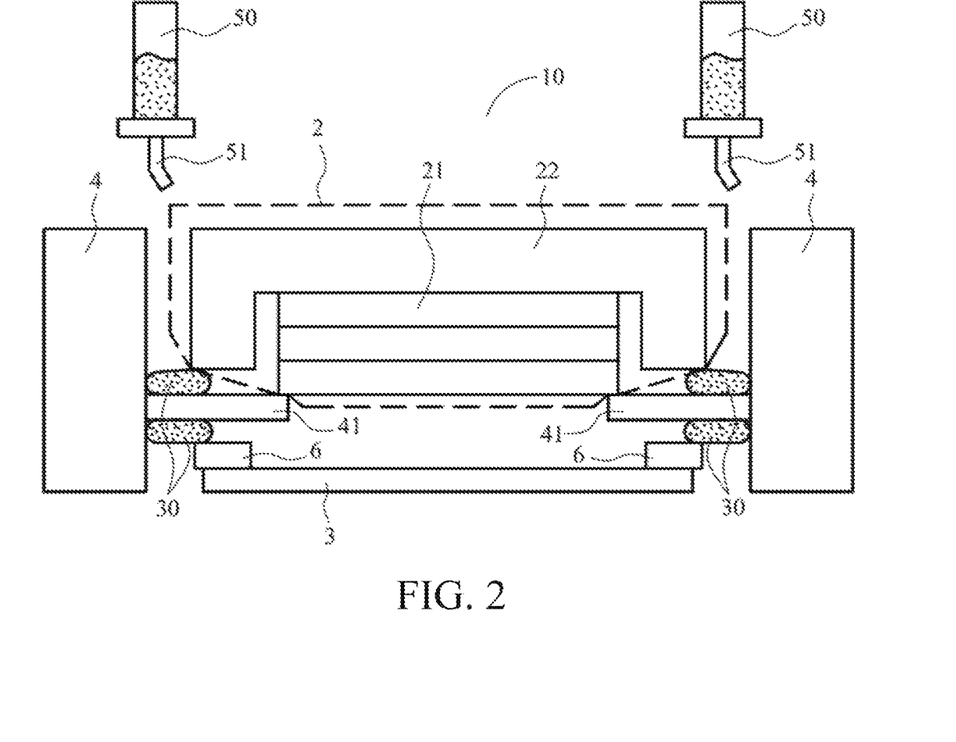
FIG. 2 is a partially structural schematic diagram of another exemplary liquid crystal display.

Referring to FIG. 2, FIG. 2 is a partially structural schematic diagram of another exemplary liquid crystal display 10. As shown in FIG. 2, a difference between the liquid crystal display 10 and the liquid crystal display of FIG. 1 lies in that the adhesive 5 is replaced with silica gel 30 for engaging the backplane 22 of the liquid crystal display 10 with the spacer 41 of the frame 4. Other structures of the liquid crystal display 10 are therefore the same as structures of the liquid crystal display 1 and are represented by same symbols.

Generally, a gel dispensing process includes: accommodating the silica gel 30 in a dispensing head 50, controlling parameters such as time, temperature, and output amount, and outputting an appropriate amount of the silica gel 30 from an output hole 51 to a position between the spacer 41 of the frame 4 and the backplane 22, so that the frame 4 is adhered to the backplane 22; then, after the silica gel 30 is cooled and solidified, turning over the liquid crystal display 10 by 180 degrees and outputting an appropriate amount of the silica gel 30 to a position between the adhesive 6 of the liquid crystal display panel 3 and the spacer 41, and to a position between the spacer 41 of the frame 4 and the adhesive 6, so that the frame 4 is adhered to the liquid crystal display panel 3.

Figure 3:
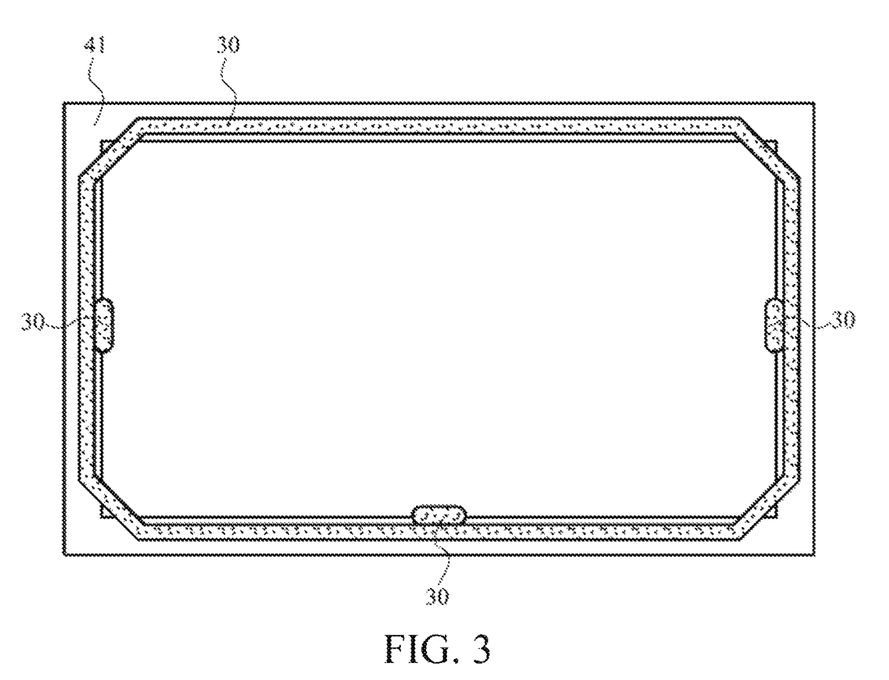
FIG. 3 is a schematic diagram of glue overflowing of a spacer after applying a gel dispensing process to the frame structure of FIG. 2.

FIG. 3 is a schematic diagram of glue overflowing of a spacer after applying a gel dispensing process to the frame structure of FIG. 2. Referring to FIG. 3, the silica gel 30 has a glue overflowing phenomenon at some positions of the spacer 41 of the frame 4. Not only longer time is needed for the silica gel 30 to be solidified, but also yield of production of the liquid crystal display is severely affected.

A difference between the liquid crystal display of this application and the existing liquid crystal display 10 of FIG. 2 lies in different designs of a spacer 45 of the frame structure, and other parts are the same or similar. Therefore, same components are numbered with same symbols, and it is clearly described in advance.

Figure 4:
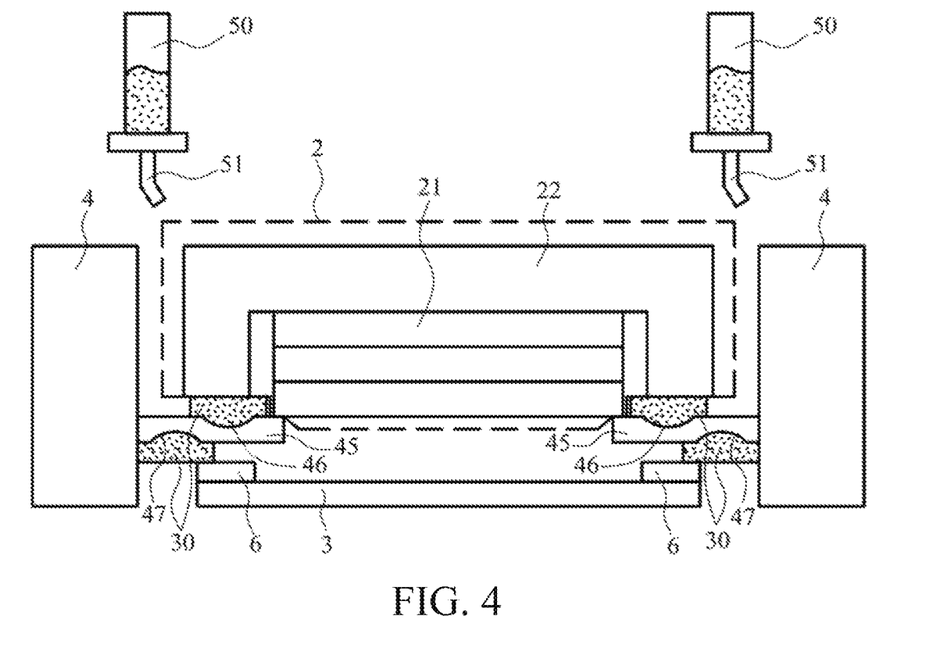
FIG. 4 is a partially structural schematic diagram of a liquid crystal display according to this application.

Referring to FIG. 4, FIG. 4 is a partially structural schematic diagram of a liquid crystal display according to this application. As shown in FIG. 4, the liquid crystal display of this application at least includes a back light unit 2, a liquid crystal display panel 3, and a frame structure 4. The back light unit 2 includes a back light module 21 and a backplane 22 bearing the back light module 21. In this embodiment, the backplane 22 may be a backplane 22, which may be, for example, an aluminum backplane. But the backplane 22 is not limited thereto. The backplane 22 may alternatively be a plastic backplane. The back light module 21 is formed by a diffuse sheet, a prism sheet, and a reflective brightness enhancement film that are disposed on the backplane 22 according to a sequence. The frame structure 4 includes a spacer 45, having a first surface and a second surface. The spacer 45 may be an integrally shaped structure, or an assembly of a plurality of components. The spacer 45 is formed by extending in a direction perpendicular to a periphery of the frame structure 4 towards a position between the backplane 22 and the liquid crystal display panel 3, and the liquid crystal display panel 3 may be engaged with the backplane 22 by means of the spacer 45.

In addition, a rear end of the spacer 45 or an end of the spacer 45 close to the backplane 22 includes a first glue receiving slot 46, which is formed in a surface of the spacer 45 close to the backplane 22. A front end of the spacer 45 or an end of the spacer 45 away from the backplane 22 includes a second glue receiving slot 47, which is formed in a surface of the spacer 45 away from the backplane 22. That is, the first glue receiving slot 46 and the second glue receiving slot 47 are respectively formed at the rear end and the front end of the spacer 45 in a staggered manner. The first glue receiving slot 46 is located in the first surface of the spacer, and the second glue receiving slot 47 is located in the second surface of the spacer, so that overflowed silica gel 30 is accommodated therein when the silica gel 30 is embedded in the spacer 45 of the frame structure 4 by using a dispenser in a gel dispensing process.

In this embodiment, a method for assembling the liquid crystal display includes: accommodating a silica gel 30 in a dispensing head 50 by using a dispenser in a gel dispensing process, where a black silica gel 30 is preferably used, controlling parameters such as time, temperature, and output amount, and outputting an appropriate amount of the black silica gel 30 from an output hole 51 to a position between the spacer 45 of the frame 4 and the backplane 22, so that the frame 4 is adhered to the backplane 22. In this way, redundant black silica gel 30 on the spacer 45 flows to the first glue receiving slot 46 instead of adhering to other components, thereby effectively resolving the problem of glue overflowing that easily occurs at a frame structure of a liquid crystal display.

Subsequently, after the black silica gel 30 between the spacer 45 of the frame 4 and the backplane 22 is cooled and solidified, the liquid crystal display is turned over by 180 degrees, and an appropriate amount of the black silica gel 30 is output from a position between the adhesive 6 of the liquid crystal display panel 3 and the spacer 45 of the frame 4 to a position between the spacer 45 of the frame 4 and the adhesive 6, so that the frame 4 is adhered to the liquid crystal display panel 3. In this way, redundant black silica gel 30 on the spacer 45 flows to the second glue receiving slot 47 instead of adhering to other components, thereby effectively resolving the problem of glue overflowing that easily occurs at a frame structure of a liquid crystal display.

The black silica gel 30 is high-temperature gel in the dispensing head 50, and after being output in an appropriate amount from the output hole 51, the black silica gel 30 forms a thin viscose glue having a thickness of between 0.2 mm to 0.5 mm, preferably, 0.3 mm, between the frame 4 and the backplane 22. After the thin viscose glue is cooled, the frame 4 is adhered to the backplane 22, thereby reducing the distance between the frame 4 and the backplane 22, and effectively resolving the problem of light leakage at the side of liquid crystal display. In addition, the optical density (OD) value of the black silica gel 30 ranges from 2/0.8 μm to 2/0.2 μm, preferably, 2/0.5 μm, so that the problem of light leakage at the side of liquid crystal display can be effectively resolved.

Figure 5A:
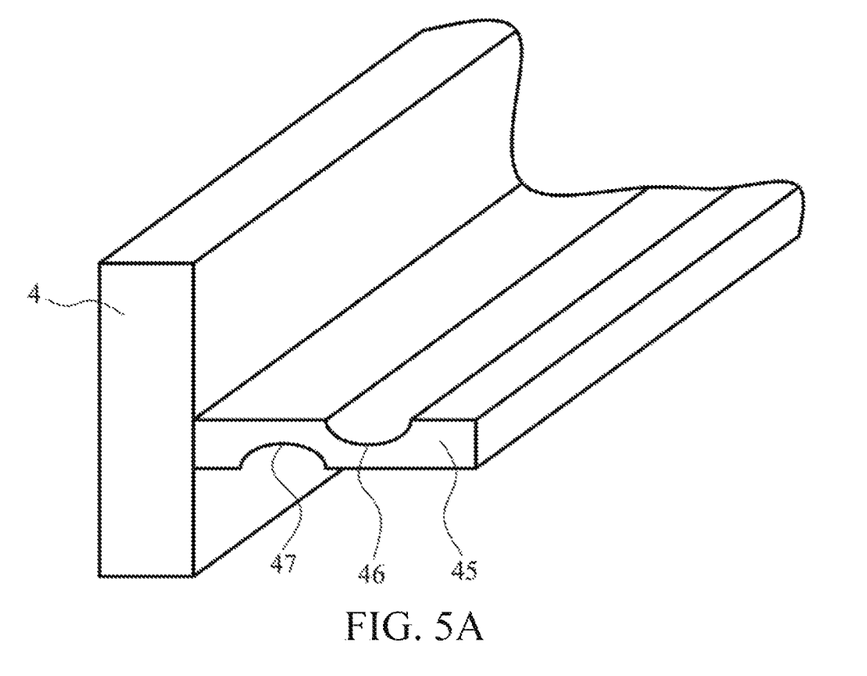
FIG. 5A is a partially structural schematic diagram of a frame structure of a liquid crystal display according to this application.
Figure 5B:
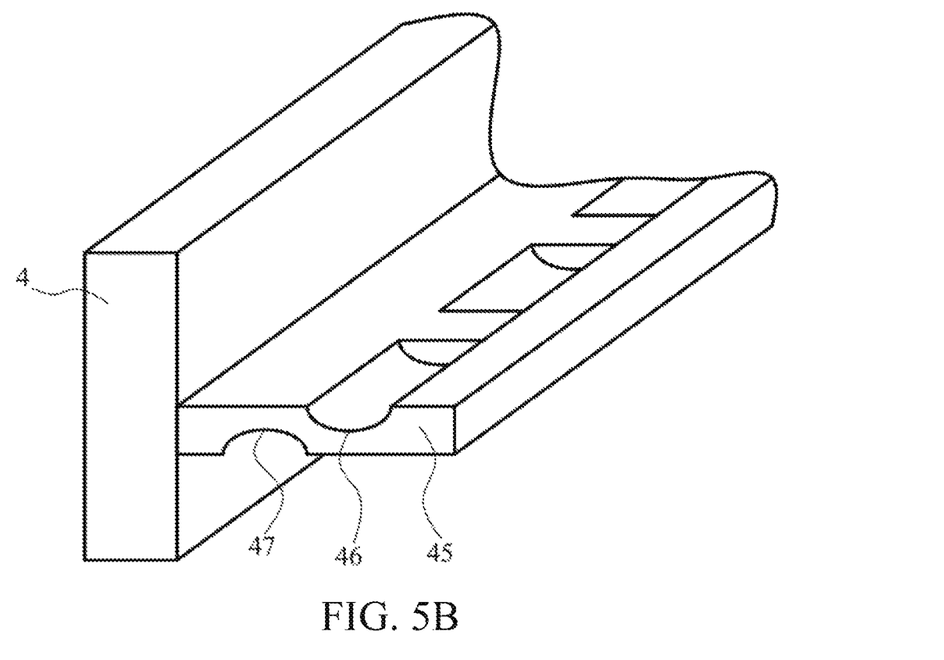
FIG. 5B is a partially structural schematic diagram of another embodiment of a frame structure of a liquid crystal display according to this application.
Figure 5C:
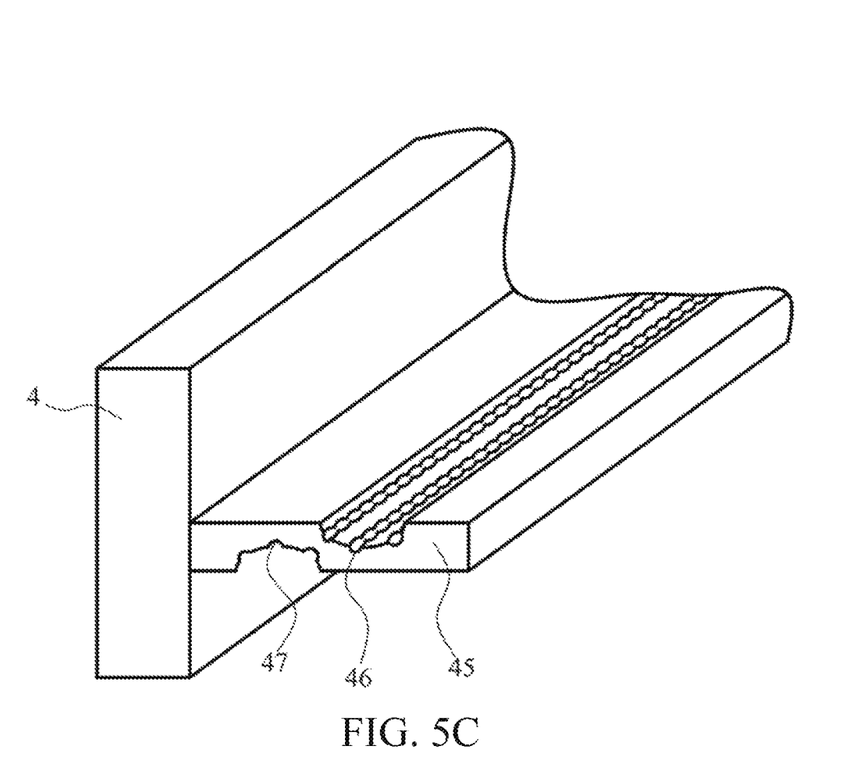
FIG. 5C is a partially structural schematic diagram of another embodiment of a frame structure of a liquid crystal display according to this application.

Referring to FIG. 5A to FIG. 5C, FIG. 5A to FIG. 5C describe a schematic diagram of variation of different embodiments of the frame structure 4 according to this application. It is particularly described that the following embodiments are examples of this application, but should not be considered as limitation to a design of the frame structure 4 of this application. Any structural design in which an overflowed-glue receiving body is designed on the frame structure shall not depart from the spirit of the design of the frame structure of this application.

As shown in 5A, according to the frame structure 4 of this embodiment, a trough-shaped first glue receiving slot 46 is formed at one end of the spacer 45 close to the backplane 22, or a trough-shaped second glue receiving slot 47 is formed at one end of the spacer 45 away from the backplane 22. As shown in FIG. 5B, the first glue receiving slot 46 and/or the second glue receiving slot 47 may be designed as a plurality of glue receiving holes that are arranged at intervals. As shown in FIG. 5C, the first glue receiving slot 46 and/or the second glue receiving slot 47 may be designed as a plurality of wavy glue receiving troughs. Certainly, designing of structures and shapes of the first glue receiving slot 46 and/or the second glue receiving slot 47 may be the same or different, or may be designing of consecutive troughs or holes or non-consecutive troughs or holes.

In the foregoing embodiments, a gel dispensing manufacturing process of the black silica gel 30 is matched with a structural design of the spacer 45 of the frame structure 4, so that the gel dispensing manufacturing process not only is applicable to a manufacturing process of a narrow-bezel liquid crystal display panel, but also can be widely applied to a manufacturing process of a flexible thin film transistor (flexible TFT) liquid crystal display.

This embodiment in which exemplary adhered conductive adhesive and foam are replaced with black silica gel, and spacers of a frame structure of a liquid crystal display are designed in a shape that can accommodate overflowed glue has several advantages as below: the strength of solidified black silica gel 30 may reach 2 MPa or more in a reliability analysis (RA) test, so that only 8 to 12 screws need to be used for locking a frame 4 and a backplane 22, effectively resolving the problem that large manpower is needed for assembling in the conventional art; because the black silica gel 30 has adhesion and ductibility, the problem of pollution caused by falling of gel scrap after a conductive adhesive and a foam are adhered in the conventional art, a complicated step of adhering the conductive adhesive and the foam is omitted, and production efficiency of the liquid crystal display is improved; the black silica gel 30 is black gel and can narrow a gap between the frame 4 and the backplane 22 and effectively prevent the problem of light leakage at the side of the liquid crystal display; and the structural design of the frame 4 alleviates the problem of glue overflowing in a gel dispensing process.

Terms such as "in some embodiments" and "in various embodiments" are repeatedly used. Usually, the terms do not refer to a same embodiment; but they may also refer to a same embodiment. Words such as "comprise", "have", "include" are synonyms, unless other meanings are indicated in the context.

The foregoing descriptions are merely preferred embodiments of this application, and are not intended to limit this application in any form. Although this application has been disclosed above through the preferred embodiments, the embodiments are not intended to limit this application. Any person skilled in the art can make some equivalent variations or modifications according to the foregoing disclosed technical content without departing from the scope of the technical solutions of this application to obtain equivalent embodiments. Any simple amendment, equivalent change or modification made to the foregoing embodiments according to the technical essence of this application without departing from the content of the technical solutions of this application shall fail within the scope of the technical solutions of this application.

What is claimed is:

1. A frame structure applied to a display, comprising:
    a spacer, having a first surface and a second surface, and formed by extending in a direction perpendicular to a periphery of the frame structure;
    a first glue receiving slot, disposed at a rear end of the spacer; and
    a second glue receiving slot, disposed at a front end of the spacer, wherein
    the first glue receiving slot and the second glue receiving slot are disposed in a staggered manner, the first glue receiving slot is located at the first surface of the spacer, and the second glue receiving slot is located at the second surface of the spacer.

2. The frame structure according to claim 1, wherein the first glue receiving slot comprises a plurality of glue receiving holes formed at the rear end of the spacer of the frame structure.

3. The frame structure according to claim 1, wherein the second glue receiving slot comprises a plurality of glue receiving holes formed at the front end of the spacer of the frame structure.

4. The frame structure according to claim 1, wherein the first glue receiving slot comprises a plurality of glue receiving troughs formed at the rear end of the spacer of the frame structure.

5. The frame structure according to claim 4, wherein the glue receiving troughs are wavy glue receiving troughs.

6. The frame structure according to claim 1, wherein the second glue receiving slot comprises a plurality of glue receiving troughs fainted at the front end of the spacer of the frame structure.

7. The frame structure according to claim 6, wherein the glue receiving troughs are wavy glue receiving troughs.

8. A liquid crystal display, comprising:
    a back light unit, comprising a back light module and a backplane bearing the back light module:
    a liquid crystal display panel, engaged with the backplane by means of a spacer; and
    a frame structure, comprising:
    a spacer, having a first surface and a second surface, and formed by extending in a direction perpendicular to a periphery of the frame structure towards a position between the backplane and the liquid crystal display panel;
    a first glue receiving slot, disposed at a rear end of the spacer; and
    a second glue receiving slot, disposed at a front end of the spacer, wherein
    the first glue receiving slot and the second glue receiving slot are disposed in a staggered manner, the first glue receiving slot is located at the first surface of the spacer, and the second glue receiving slot is located at the second surface of the spacer, wherein
    the silica gel is embedded by using a dispenser in a gel dispensing process, so that the frame structure is respectively adhered to the backplane and the liquid crystal display panel.

9. The liquid crystal display according to claim 8, wherein the backlight module at least comprises a diffuse sheet, a prism sheet, and a reflective brightness enhancement film that are disposed on the backplane according to a sequence.

10. The liquid crystal display according to claim 8, wherein the first glue receiving slot comprises a plurality of glue receiving holes formed at the rear end of the spacer of the frame structure.

11. The liquid crystal display according to claim 8, wherein the second glue receiving slot comprises a plurality of glue receiving holes formed at the front end of the spacer of the frame structure.

12. The liquid crystal display according to claim 8, wherein the first glue receiving slot comprises a plurality of glue receiving troughs formed at the rear end of the spacer of the frame structure.

13. The liquid crystal display according to claim 12, wherein the glue receiving troughs are wavy glue receiving troughs.

14. The liquid crystal display according to claim 8, wherein the second glue receiving slot comprises a plurality of glue receiving troughs formed at the front end of the spacer of the frame structure.

15. The liquid crystal display according to claim 14, wherein the glue receiving troughs are wavy glue receiving troughs.

16. A frame structure applied to a display, comprising:
    a spacer, having a first surface and a second surface, and formed by extending in a direction perpendicular to a periphery of the frame structure;
    a first glue receiving slot, disposed at a rear end of the spacer, wherein the first glue receiving slot is located at the first surface of the spacer; and
    a second glue receiving slot, disposed in a staggered manner with the first glue receiving slot, and disposed at a front end of the spacer, wherein the second glue receiving slot is located at the second surface of the spacer, wherein the first glue receiving slot and the second glue, receiving slot comprise a plurality of glue receiving holes or a plurality of glue receiving troughs, the glue receiving holes are a trough-shaped glue receiving hole or a plurality of glue receiving holes that are arranged at intervals, and the glue receiving troughs are wavy glue receiving troughs.

* * * * *